UNITED STATES PATENT OFFICE.

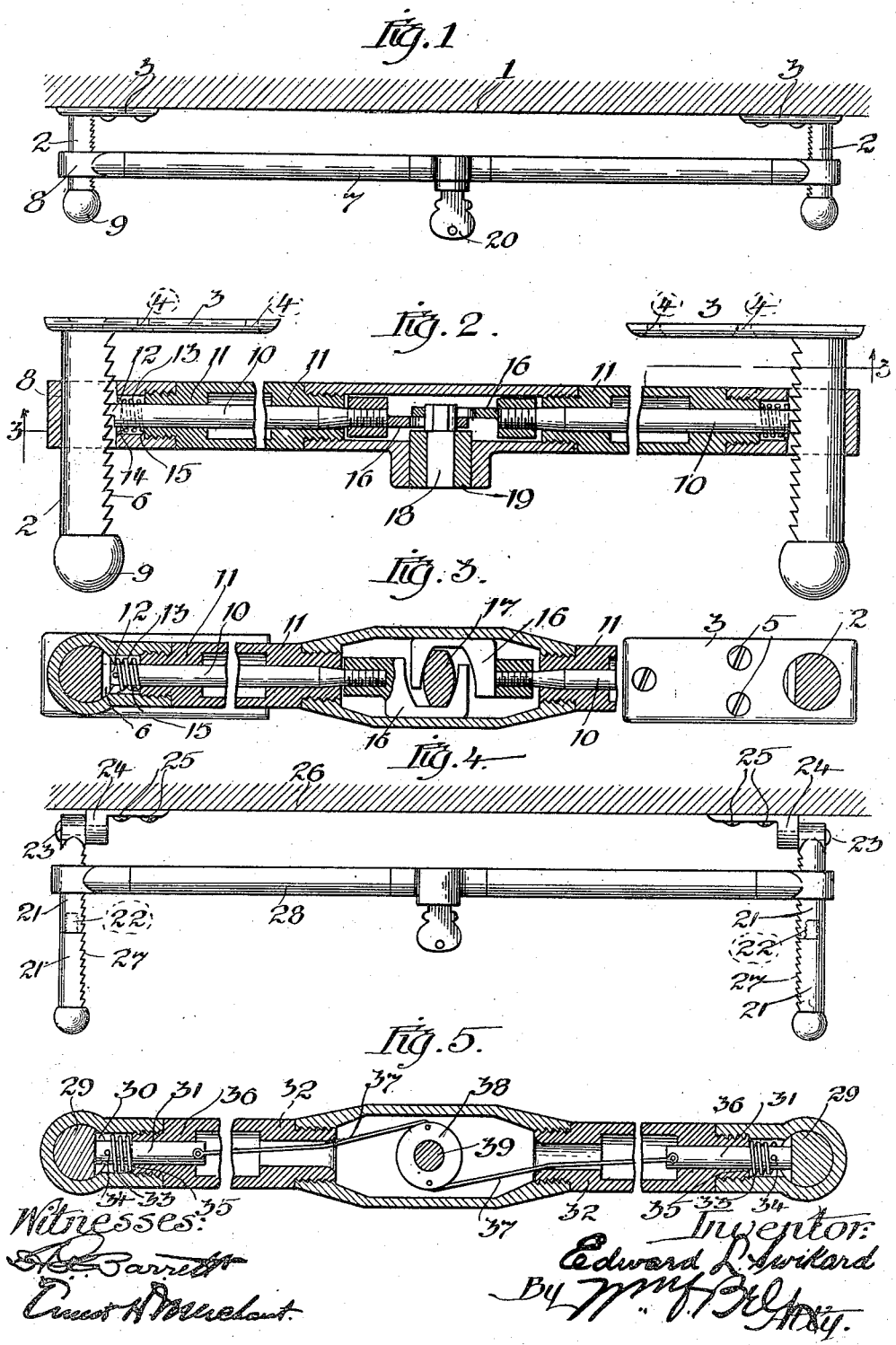

EDWARD L. SWIKARD, OF CHICAGO, ILLINOIS.

ROBE-HOLDER.

1,203,809.  Specification of Letters Patent.  Patented Nov. 7, 1916.

Application filed March 10, 1916.  Serial No. 83,268.

*To all whom it may concern:*

Be it known that I, EDWARD L. SWIKARD, a citizen of the United States, residing at Chicago, in the county of Cook and State of Illinois, have invented certain new and useful Improvements in Robe-Holders, of which the following is a specification.

This invention relates to robe holders and more particularly to a device adapted for use in motor driven and other vehicles to prevent the unauthorized removal of robes therefrom.

It is the principal object of my invention to provide a robe holder comprising a minimum number of simple and inexpensive parts which may be readily moved to locking position and when in locking position will securely hold one or more robes against unauthorized removal.

A further object of my invention is the provision of a robe holder in which the means for securing it to the vehicle is protected when the holder is in locking position.

A further object of my invention is the provision of a robe holder of the character described which is so disposed when not in use as not to obstruct the space within the vehicle, which may be readily moved to position to securely hold one or more robes as desired and which may be extended to increase its normal capacity.

Further objects and advantages of my invention will be apparent as it is better understood by reference to the following specification when read in connection with the accompanying drawing, illustrating the preferred embodiments thereof, in which—

Figure 1 is a plan view of a robe holder according to my invention; Fig. 2 is an enlarged horizontal section through the structure illustrated in Fig. 1; Fig. 3 is a vertical section on the line 3—3 of Fig. 2; Fig. 4 is a plan view of a slightly different form of my invention, and Fig. 5 is a view similar to Fig. 3 illustrating a slightly different controlling mechanism.

Referring to the drawing, 1 indicates a suitable support such as a back of an automobile seat. A pair of studs 2 are provided with feet 3 having openings 4 therein adapted to receive the screws 5 whereby the studs 2 are independently secured to the support 1. Each of the studs 2 is provided with one-way ratchet teeth 6. A hollow bar 7 is provided at either end with a member 8 adapted to embrace the studs 2 which are provided with ball-shaped ends 9 to prevent removal of the bar 7 after the parts have been assembled.

Within the bar 7 members 10 are slidably disposed in suitable bearings 11 and provided at their extremities with teeth 12 adapted to engage the teeth 6 on the studs 2, the members 10 being normally pressed in the direction of the studs 2 by the springs 13 disposed about the members 10 between the pins 14 and shoulders 15 formed by the bearings 11. Secured to the opposite ends of the members 10 are hook-shaped members 16 engaging the opposite sides of a cam member 17 which is secured to the rotatable cylinder 18 of a suitable lock 19, controlled by a removable key 20.

The operation of my robe holder will be readily understood from the following brief description. It will be noted that the formation of the teeth 6 and 12 is such that the bar 7 may be freely moved in the direction of the support 1, the members 10 being moved inwardly against the springs 13 as the teeth 12 ride over the teeth 6. The hook-shaped members 16 provide sufficient lost motion to allow this operation when the cam member 17 is in normal position. The formation of the teeth 6 and 12 prevent movement of the bar 7, however, in the reverse direction and this movement can only be accomplished by inserting the key 20 in the lock 19 and rotating the cylinder 18 and the cam member 17 to withdraw the teeth 12 from engagement with the teeth 6. To secure one or more robes the bar 7 is freed and moved away from the support 1 a sufficient distance to allow the insertion of the robes between the bar 7 and the support 1, after which the bar 7 is forced in the direction of the support 1 until the robes are tightly clamped therebetween. It will be noted that the openings 4 in the feet 3 are disposed behind the bar 7 and that consequently the screws 5 can not be removed while the bar 7 is in robe-locking position. Consequently the purpose of the device can not be defeated by the removal of the screws 5.

In Fig. 4 of the drawing I have illustrated a slightly different form of my invention in which the studs comprise a plurality of sections 21 threadedly connected at 22, the purpose being to extend the studs as desired to hold a plurality of robes. The studs 21 are pivotally connected at 23 to members 24 secured by screws 25 to a support 26. The studs 21 are provided with ratchet teeth 27, as in the previously described form of my invention, and the bar 28 is similarly constructed and it operates in the same manner to securely lock the robes.

In Fig. 5 of the drawing I have illustrated a slightly different form of my invention in which the studs 29 are provided with teeth 30 with which members 31 slidably mounted within the bar 32 coöperate. Springs 33 disposed between pins 34 and shoulders 35, formed by the bearings 36, normally bias the members 31 in the direction of the studs 29. The members 31 are connected by flexible members 37 to a drum 38 secured to the rotatable lock cylinder 39, key-controlled in the usual manner. The bar 32 is freely movable toward its supports on the studs 29 as in the structures previously described and when it is desired to move the rod 32 in the opposite direction the lock cylinder 39 is rotated by means of a suitable key and the members 31 are withdrawn from engagement with the teeth 30 through the medium of the flexible connecting members 37 by the rotation of the drum 38.

From the preceding description it will be readily understood that I have perfected a device adapted to securely hold robes which is extremely simple in construction and free from parts which are liable to derangement. It will be apparent that various changes may be made in the form, construction and arrangement of the parts without departing from the spirit and scope of the invention or sacrificing any of its material advantages, the forms hereinbefore disclosed being merely preferred embodiments thereof.

I claim:

1. A robe holder comprising a pair of studs enlarged at their outer ends and provided at their inner ends with feet having openings therein to receive fastening screws, whereby said studs may be independently mounted on a supporting structure, rigid teeth on said studs, a hollow bar having means at either end thereof to embrace said studs between said feet and the enlarged outer ends, the openings in said feet being disposed behind said bar, whereby removal of the screws is prevented until said bar is first removed, spring-pressed members within said bar adapted to engage said teeth, and key-controlled means to disengage said members from said teeth.

2. A robe holder comprising a pair of independent studs, each comprising a plurality of threaded connected sections provided with ratchet teeth, means pivotally connected to said studs to support the latter in spaced relation, a hollow bar having means at either end to embrace said studs, spring-pressed members within said bar to engage said teeth, said members and teeth being formed to allow relative movement in one direction only while said members and teeth remain in engagement, and key-controlled means to disengage said members from said teeth.

EDWARD L. SWIKARD.

Witnesses:
HARRY I. WILDENBERG,
JOHN W. PLAIN.

Copies of this patent may be obtained for five cents each, by addressing the "Commissioner of Patents, Washington, D. C."